United States Patent
Tsirkin

(10) Patent No.: US 10,810,032 B2
(45) Date of Patent: Oct. 20, 2020

(54) SYSTEM AND METHOD FOR DYNAMIC GUEST-CONTROLLED HALT POLLING USING A CPU GOVERNOR

(71) Applicant: Red Hat, Inc., Raleigh, NC (US)

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 439 days.

(21) Appl. No.: 15/438,999

(22) Filed: Feb. 22, 2017

(65) Prior Publication Data

US 2018/0239627 A1    Aug. 23, 2018

(51) Int. Cl.
*G06F 9/455* (2018.01)

(52) U.S. Cl.
CPC ...... *G06F 9/45558* (2013.01); *G06F 9/45533* (2013.01); *G06F 2009/45575* (2013.01)

(58) Field of Classification Search
CPC ....... G06F 9/45558; G06F 2009/45575; G06F 2009/45583
See application file for complete search history.

(56) References Cited

U.S. PATENT DOCUMENTS

| | | | |
|---|---|---|---|
| 8,296,767 B1 | 10/2012 | Waldspurger et al. | |
| 8,352,944 B2 | 1/2013 | Weissman et al. | |
| 8,635,615 B2* | 1/2014 | Chiang | G06F 9/45533 718/1 |
| 8,799,891 B2 | 8/2014 | Cherkasova et al. | |
| 8,875,162 B2 | 10/2014 | Agesen et al. | |
| 9,292,331 B2 | 3/2016 | Lango et al. | |
| 2010/0115169 A1* | 5/2010 | Yoo | G06F 13/24 710/267 |
| 2014/0331222 A1* | 11/2014 | Zheng | G06F 9/45558 718/1 |
| 2015/0242229 A1* | 8/2015 | van Riel | G06F 9/45545 718/1 |
| 2015/0347169 A1* | 12/2015 | Tsirkin | G06F 9/45545 718/1 |
| 2015/0356035 A1* | 12/2015 | Singh | G06F 13/24 712/244 |
| 2018/0348840 A1* | 12/2018 | Tsirkin | G06F 9/5077 |

FOREIGN PATENT DOCUMENTS

WO    2016/168487 A1    10/2016

OTHER PUBLICATIONS

Singh et al. "doc/Kvm: Add halt polling documentation" Patchwork KVM Development, Oct. 10, 2016, pp. 1-12. Online link "https://patchwork.kernel.org/patch/9375987/".*

(Continued)

*Primary Examiner* — Meng Ai T An
*Assistant Examiner* — Willy W Huaracha
(74) *Attorney, Agent, or Firm* — K&L Gates LLP

(57) ABSTRACT

A system and method for dynamic guest controlled halt polling includes a memory, one or more physical processors in communication with the memory, a virtual machine executing on the one or more physical processors, and a hypervisor executing on the one or more physical processors. In an example, the hypervisor detects a request to disable halt polling. Then, the hypervisor sets a halt polling disable flag in hypervisor memory. The halt polling disable flag is associated with a virtual central processing unit (VCPU) of the virtual machine.

17 Claims, 7 Drawing Sheets

(56) References Cited

OTHER PUBLICATIONS

Costa et al. "KVM-specific MSRs" 2010, pp. 1-5 Online link "https://www.kernel.org/doc/Documentation/virtual/kvm/msr.txt" (Year: 2010).*
Ben-Yehuda, et al. "Adding advanced storage controller functionality via low-overhead virtualization." FAST. vol. 12. 2012, pp. 1-8 (Year: 2012).*
Tian et al., How virtualization makes power management different, Intel Open Source Technology Center, 2007 Linux Symposium, vol. One (12 pages).
Notes for Day-2 KVMForum, 2015 (7 pages) Link: https://kashyapc.fedorapeople.org/virt/Notes-from-KVMForum-2015-talks/day2-notes-kvm-forum.txt.
Best Practices for Performance Tuning of Latency-Sensitive Workloads in vSphere VMs, Copyright 2013 VMware, Inc. (10 pages).

* cited by examiner

SYSTEM AND METHOD FOR DYNAMIC GUEST-CONTROLLED HALT POLLING USING A CPU GOVERNOR

BACKGROUND

Virtualization may be used to provide some physical components as logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines, which may increase the hardware utilization rate.

Virtualization may be achieved by running a software layer, often referred to as a hypervisor, above the hardware and below the virtual machines. A hypervisor may run directly on the server hardware without an operating system beneath it or as an application running on a traditional operating system. A hypervisor may virtualize the physical layer and provide interfaces between the underlying hardware and virtual machines. Processor virtualization may be implemented by the hypervisor scheduling time slots on one or more physical processors for a virtual machine, rather than a virtual machine actually having a dedicated physical processor.

SUMMARY

The present disclosure provides a new and innovative system and methods for dynamic guest controlled halt polling. In an example, a system includes a memory, one or more physical processors in communication with the memory, a virtual machine executing on the one or more physical processors, and a hypervisor executing on the one or more physical processors. In an example, the hypervisor detects a request to disable halt polling. Then the hypervisor sets a halt polling disable flag in hypervisor memory. The halt polling disable flag is associated with a virtual central processing unit (VCPU) of the virtual machine.

Additional features and advantages of the disclosed method and apparatus are described in, and will be apparent from, the following Detailed Description and the Figures.

DETAILED DESCRIPTION OF EXAMPLE EMBODIMENTS

Figure 1:
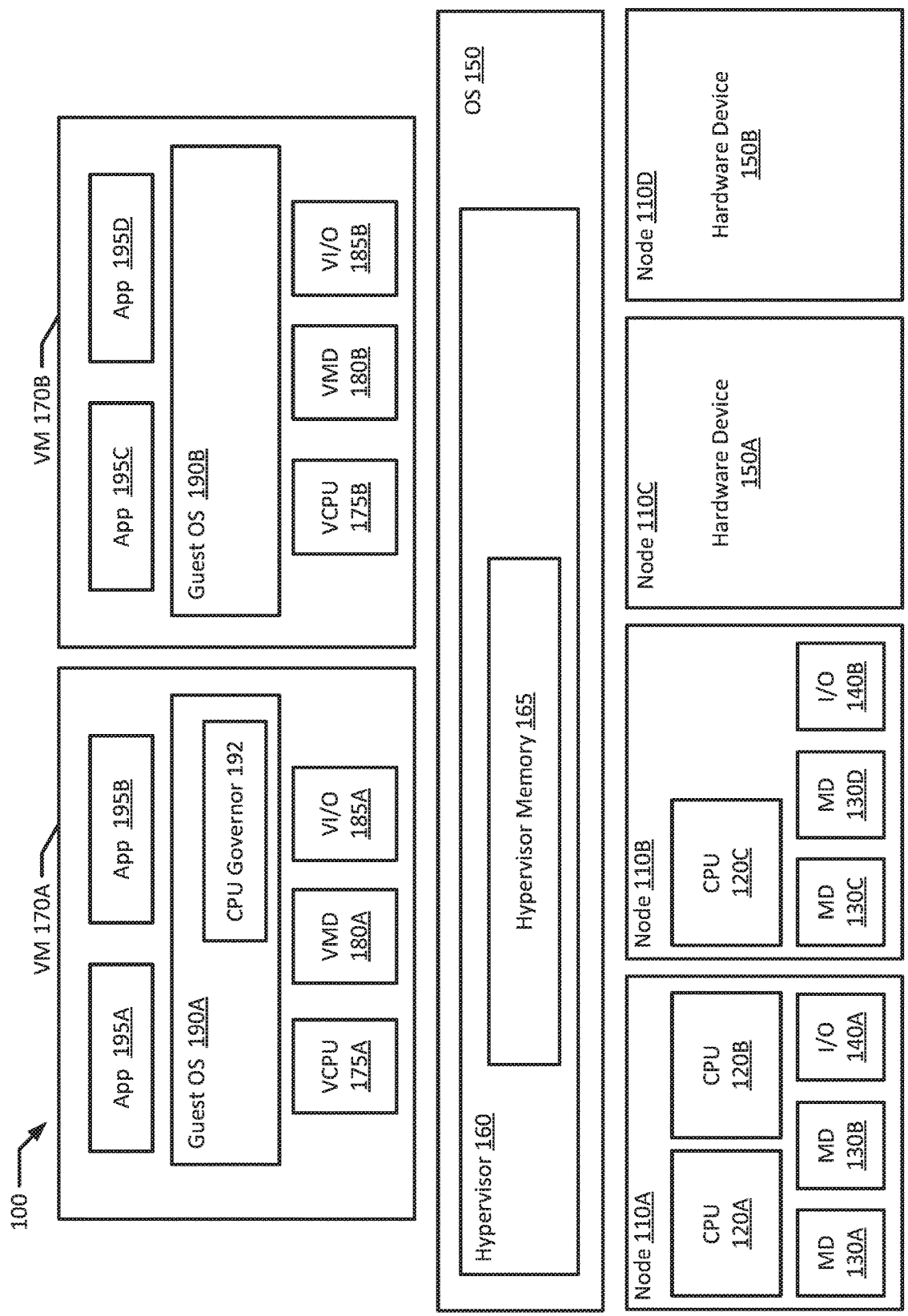
FIG. 1 is a block diagram of an example computer system according to an example of the present disclosure.

Described herein are methods and systems for dynamic guest controlled halt polling. Generally, when a virtual central processing unit (VCPU) has no tasks to process and is in an idle state, a guest may send a request to halt the VCPU to the hypervisor, which may cause a virtual machine (VM) exit to the hypervisor. That is, the physical processor on which the guest/VCPU was running may be switched from a guest mode to a hypervisor mode after the guest issues the halt request. Then, the hypervisor may halt the VCPU and run another task (e.g., another VCPU) on the physical processor on which the halted VCPU was running. However, if an interrupt arrives for the halted VCPU soon after the VCPU was halted and another task starts running on the physical processor, the hypervisor may need to stop the other task (e.g., another VCPU), which may cause another VM exit to the hypervisor, and reenter the guest mode to run the halted VCPU to process the interrupt, which may increase the latency of the system.

Halt-polling is a hypervisor technique where, when detecting a request to halt a VCPU, a hypervisor may poll the VCPU for a while and wait for an interrupt for the VCPU to arrive instead of halting the VCPU right away. As used herein, polling a VCPU may refer to a situation where the hypervisor waits for an interrupt to arrive for the given VCPU and refrains from running another task (e.g., another VCPU) on the physical processor on which the given VCPU was running. Sometimes, the hypervisor may include an extra logic attempting to predict when an interrupt will arrive for a given VCPU and, based on the prediction, the hypervisor may determine whether to wait for a new interrupt or halt the VCPU. In this way, halt-polling may increase the chance that a new interrupt will arrive while the virtual machine is running or the hypervisor is polling, reducing the number of VM exits and, thus, may be efficient in reducing latency in an interrupt-driven system.

Unfortunately, since the hypervisor polls an idle VCPU instead of executing another task (e.g., another VCPU), halt-polling may be a hindrance for over-committed CPU configurations. In particular, guests executing a paravirtualized idle CPU governor may prevent the guests from sending a request to halt a VCPU to the hypervisor when a new interrupt is expected to arrive soon. Therefore, implementing the halt-polling in such system may merely increase CPU utilization with having little effect of reducing the latency of the system.

Aspects of the present disclosure may address the above-noted deficiency. In an example, when a guest of a virtual machine is booted, the guest may load a CPU governor (e.g., a paravirtualized idle CPU governor) in the virtual machine. After loading the CPU governor, the guest may send a request to disable halt-polling of a VCPU in the guest to a hypervisor, for example, by sending a hypercall to the hypervisor. In response to detecting the request to disable the halt polling, the hypervisor sets a halt polling disable flag in hypervisor memory that is associated with the VCPU to disable the halt-polling. At a later time, when the VCPU becomes idle and/or has no task to process, the CPU governor may determine whether a new interrupt is expected to arrive for the VCPU within a predetermined amount of time. If the CPU governor determines that no new interrupt is expected to arrive within the predetermined amount of time, the guest may send a request to halt the VCPU. In response to detecting the request to halt the VCPU, the hypervisor may read the halt polling disable flag associated with the VCPU. After detecting that the halt polling disable flag for the VCPU is set (i.e., halt-polling disabled), the hypervisor may halt the VCPU and execute another task (e.g., another VCPU) on the physical processor on which the VCPU was running. The halt polling disable flag may be cleared when the virtual machine is reset or restarts such that the halt-polling is enabled.

When the guest does not load a CPU governor, for example, during the boot of the guest, the hypervisor may not set the halt polling disable flag associated with the VCPU of the guest. In an example, the default of the halt polling disable flag may be "halt-polling enabled." Therefore, when there is a request to halt the VCPU, the hypervisor may detect that the halt polling disable flag is not set (i.e., halt-polling enabled). Then, the hypervisor may implement the halt-polling.

In this way, aspects of the present disclosure may allow a guest to control the halt-polling and to disable the halt-polling when necessary (e.g., when a CPU governor is loaded in the guest). This may advantageously reduce CPU utilization significantly in a system using CPU governors, which allows addressing requirements for overcommitted CPU configurations, where more virtual machines can be executed in given physical processors, thereby saving power and money. Also, since the guest of the present disclosure may be capable of setting the halt polling disable flag dynamically, the host does not need to be reconfigured depending on guests executed, which may make system management easier. Additional features and advantages of the disclosed method, system, and apparatus are described below.

FIG. 1 depicts a high-level component diagram of an example multi-processor computer system 100 in accordance with one or more aspects of the present disclosure. The computer system 100 may include one or more interconnected nodes 110A-D. Each node 110A-B may in turn include one or more physical processors (e.g., CPU 120A-C) communicatively coupled to memory (e.g., memory 130A-D) and input/output devices (e.g., I/O 140A-B). Each node 110C-D may include a hardware device 150A-B. In an example embodiment, a hardware device (e.g., 150A-B) may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc.

As used herein, physical processor or processor 120A-C refers to a device capable of executing instructions encoding arithmetic, logical, and/or I/O operations. In one illustrative example, a processor may follow the Von Neumann architectural model and may include an arithmetic logic unit (ALU), a control unit, and a plurality of registers. In a further aspect, a processor may be a single core processor that is typically capable of executing one instruction at a time (or processing a single pipeline of instructions), or a multi-core processor that may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and, hence, share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-B refers to a device capable of providing an interface between one or more processor pins and an external device capable of inputting and/or outputting binary data. The memory device 130A-D may be divided into units referred to as pages. A page is a specific amount of contiguous memory that represents the smallest unit in which an operating system allocates for various purposes. A page of memory is a set range of addresses to which data can be stored. The operating system may swap pages from working memory to longer term storage such as a non-volatile storage.

Processors 120A-C may be interconnected using a variety of techniques, ranging from a point-to-point processor interconnect, to a system area network, such as an Ethernet-based network. Local connections within each node, including the connections between a processor 120A-B and a memory device 130A-B and between a processor 120A-B and an I/O device 140A, may be provided by one or more local buses of suitable architecture, for example, peripheral component interconnect (PCI). As used herein, a device of the OS 150, which may be referred to as a host device, may refer to CPU 120A-C, Memory 130A-D, I/O 140A-B, a software device, and/or a hardware device.

As noted above, computer system 100 may run multiple virtual machines (e.g., VM 170A-B) by executing a software layer (e.g., hypervisor 160) above the hardware and below the virtual machines 170A-B, as schematically shown in FIG. 1. In an example, the hypervisor 160 may be a component of the host operating system 150 executed by the computer system 100. In another example, the hypervisor 160 may be provided by an application running on the operating system 150, or may run directly on the computer system 100 without an operating system beneath it. The hypervisor 160 may virtualize the physical layer, including processors, memory, and I/O devices, and present this virtualization to virtual machines 170A-B as devices, including virtual processors (e.g., VCPU 175A-B), virtual memory (e.g., VMD 180A-B), and/or virtual I/O devices (e.g., VI/O 185A-B). Processor virtualization may be implemented by the hypervisor 160 scheduling time slots on one or more physical processors 120A-C such that from the guest operating system's perspective, those time slots are scheduled on a virtual processor 175A-B. The hypervisor 160 is provided with some memory referred to as hypervisor memory 165. Hypervisor memory 165 may correspond to physical pages in host memory 130A-D. Thus, a subset of the pages in host memory 130A-D may be specifically allocated for use by the hypervisor 160. The hypervisor 160 can use this memory to perform various tasks related to management of the virtual machines 170A-B. In an example, a virtual machine 170A-B may execute a guest operating system 190A-B, which may utilize the underlying VCPU 175A-B, VMD 180A-B, and VI/O devices 185A-B. One or more applications 195A-D may be running on a virtual machine 170A-B under the guest operating system 190A-B.

In an example, one or more guest operating systems (e.g., 190A) may include a CPU governor 192. The CPU governor 192 may be a driver of the guest OS 190A. The CPU governor 192 may prevent the guest (e.g., guest OS 190A, Applications 195A-B, or any firmware running within VM 170A) from sending a request to halt a VCPU (e.g., VCPU 175A) of the guest when an interrupt is expected to arrive within a predetermined amount of time. In an example, the CPU governor 192 may determine the predetermined amount of time based on a predetermined heuristic. In an example, the CPU governor 192 may be loaded when the virtual machine 170A is booted or when a VCPU 175A is added to the system. In another example, the CPU governor 192 may be loaded on demand, at random time instances, or at any other suitable time. In an example, the CPU governor 192 may be a paravirtualized idle CPU governor. In an example, some guest operating systems (e.g., 190B) may not include/load the CPU governor 192.

Figure 2:
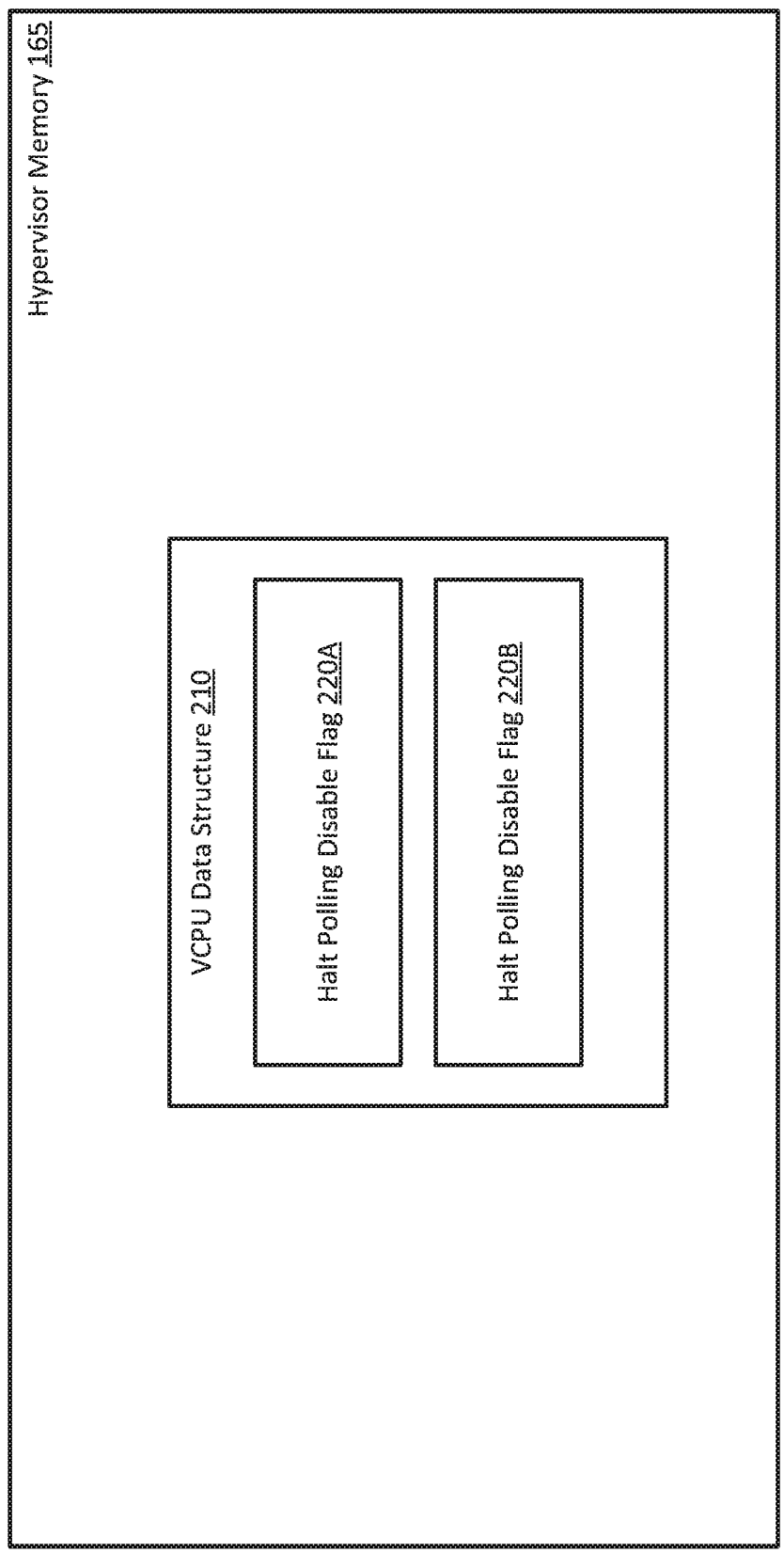
FIG. 2 is a block diagram of an example hypervisor memory according to an example of the present disclosure.

FIG. 2 illustrates an example of hypervisor memory 165. The hypervisor memory 165 may include a VCPU Data Structure 210, which is a data structure stored in memory (e.g., 130A-D). The VCPU Data Structure 210 may include information/data about each VCPU (e.g., VCPU 175A-B) running in the system. The VCPU Data Structure 210 may include Halt Polling Disable Flags 220A-B. Halt Polling Disable Flags 220A-B may include information about whether a given VCPU's halt-polling is disabled or not. Each of the Halt Polling Disable Flags 220A-B may be associated with a specific VCPU. For example, Halt Polling Disable Flag 220A may be associated with VCPU 175A and Halt Polling Disable Flag 220B may be associated with VCPU 175B. In this case, Halt Polling Disable Flag 220A may include information about whether VCPU 175A's halt-polling is enabled or disabled and Halt Polling Disable Flag 220B may include information about whether VCPU 175B's halt-polling is enabled or disabled.

In an example, Halt Polling Disable Flags 220A-B may include a value, such as 0 ("halt-polling enabled") and 1 ("halt-polling disabled"). When a hypervisor 160 sets a Halt Polling Disable Flag 220A-B, the value in the Halt Polling Disable Flag 220A-B may be changed to 1 ("halt-polling disabled"). When the Halt Polling Disable Flag 220A-B is cleared, then the value may be changed to 0 ("halt-polling enabled"). In another example, Halt Polling Disable Flags 220A-B may be configured to indicate the state of a given VCPU (e.g., halt-polling enabled/disabled) in any suitable manner. In an example, the default value of the Halt Polling Disable Flags 220A-B may be a value (e.g., "0") indicating that the halt-polling is enabled.

Figure 3:
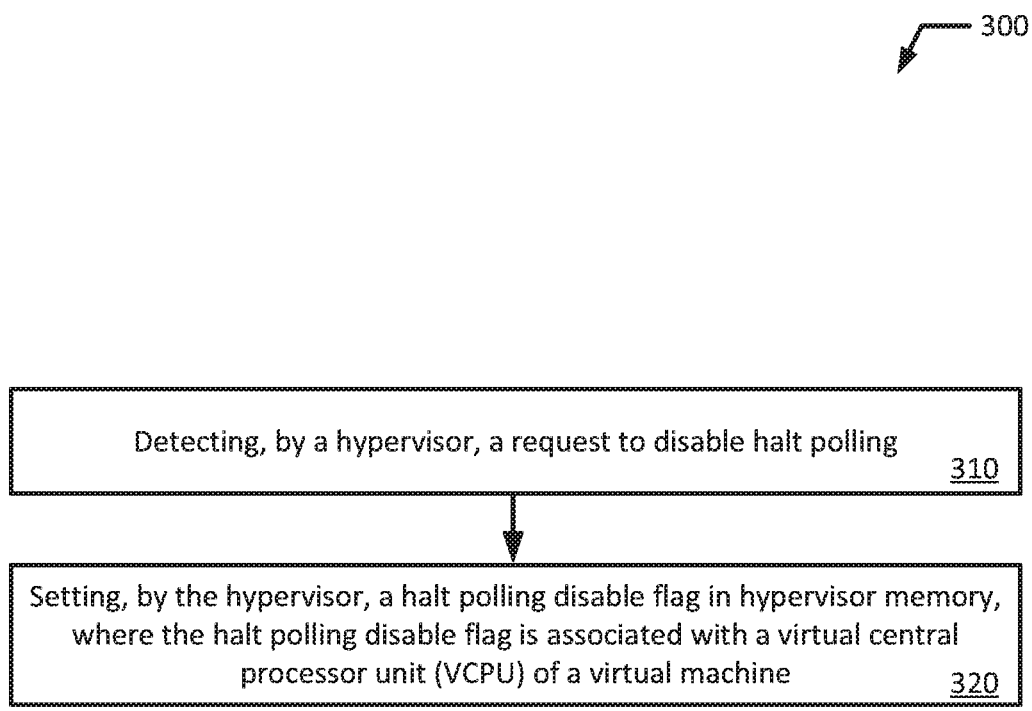
FIG. 3 is a flowchart illustrating an example process for dynamic guest controlled halt polling according to an example of the present disclosure.

FIG. 3 shows a flowchart of an example method 300 for dynamic guest controlled halt polling. Although the example method 300 is described with reference to the flowchart illustrated in FIG. 3, it will be appreciated that many other methods of performing the acts associated with the method may be used. For example, the order of some of the blocks may be changed, certain blocks may be combined with other blocks, and some of the blocks described are optional.

In the illustrated example, a hypervisor executing on one or more physical processors may detect a request to disable halt polling (block 310). For example, a hypervisor 160 executing on one or more physical processors 120A-C may detect a request to disable halt polling. In an example, a guest may send the request to disable the halt-polling when a CPU governor is loaded. In another example, the guest may send the request to disable the halt-polling at any other suitable time, for example, when the halt-polling may merely increase CPU utilization without reducing latency.

Then, the hypervisor may set a halt polling disable flag in hypervisor memory, where the halt polling disable flag is associated with a virtual central processing unit (VCPU) of a virtual machine (block 320). For example, the hypervisor 160 may set a halt polling disable flag 220A in hypervisor memory 165, where the halt polling disable flag 220A is associated with a VCPU 175A of a virtual machine 170A. In an example, the halt polling disable flag 220A may be in a VCPU data structure 210 of the hypervisor memory 165.

Figure 4A:
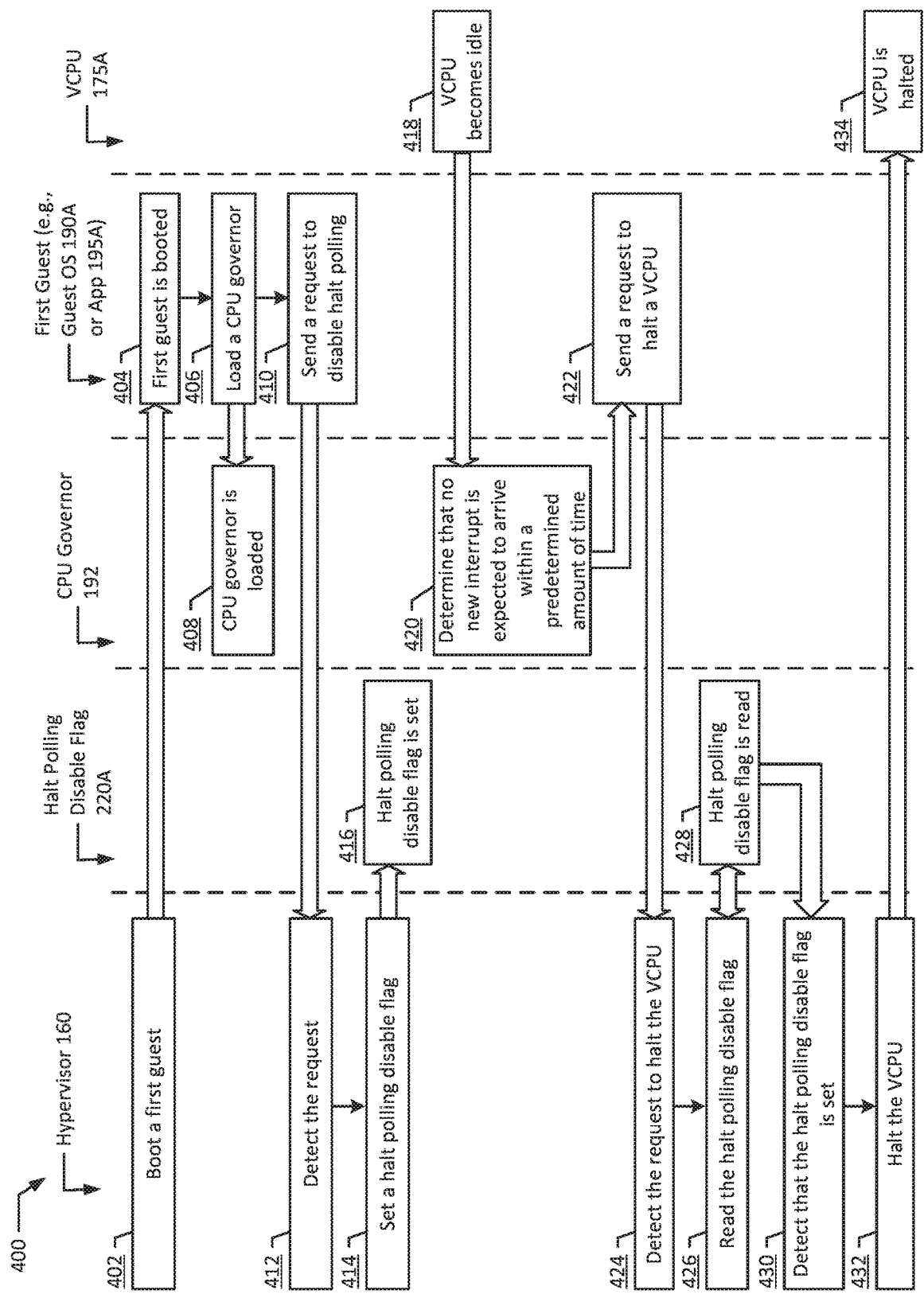
FIGS. 4A, 4B, and 4C are a flow diagram illustrating an example process for dynamic guest controlled halt polling according to an example of the present disclosure.
Figure 4B:
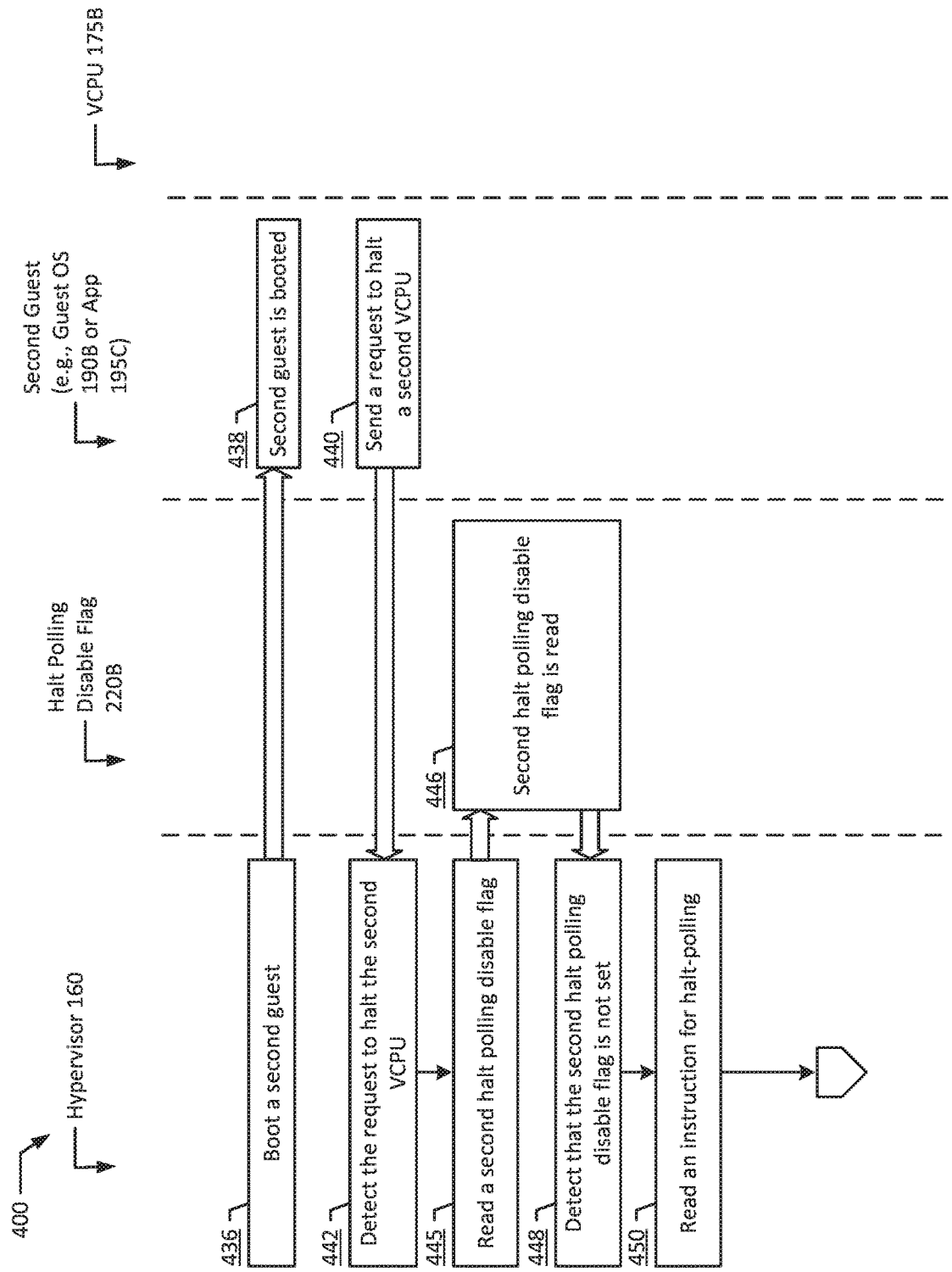
Figure 4C:
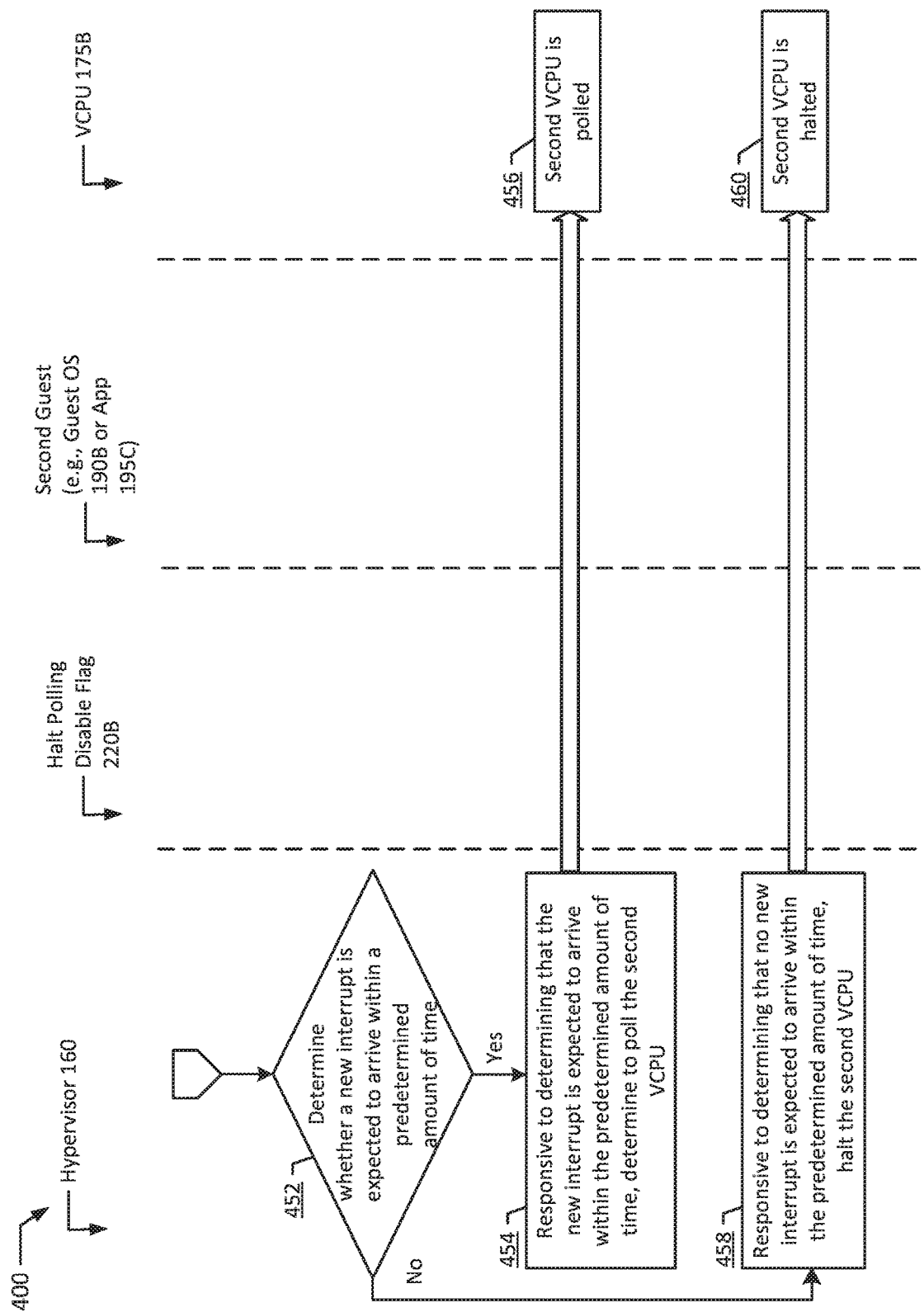

FIGS. 4A, 4B, and 4C illustrate a flow diagram of an example method 400 for dynamic guest controlled halt polling according to an example of the present disclosure. Although the example method 400 is described with reference to the flow diagram illustrated in FIGS. 4A, 4B, and 4C, it will be appreciated that many other methods of performing the acts associated with the method may be used. For example, the order of some of the blocks may be changed, certain blocks may be combined with other blocks, and some of the blocks described are optional. The method 400 may be performed by processing logic that may include hardware (circuitry, dedicated logic, etc.), software, or a combination of both. For example, the method 400 may be performed by a system including hypervisor 160, halt polling disable flags 220A-B, first guest (e.g., Guest OS 190A, App 195A-B, or guest firmware running within VM 170A), second guest (e.g., Guest OS 190B, App 195C-D, or guest firmware running within VM 170B), CPU governor 192, and VCPUs 175A-B communicating or interacting with each other.

In the illustrated example, a hypervisor 160 may boot a first guest of a virtual machine 170A (blocks 402 & 404). As used herein, a guest may refer to any software running within the virtual machines (e.g., VM 170A-B), such as guest operating systems (e.g., guest OS 190A-B) and/or applications running on the guest operating systems (e.g., Applications 195A-D), and/or may refer to guest firmware running within the virtual machines (e.g., VM 170A-B). Then, the first guest may load a CPU governor 192 in the virtual machine 170A (blocks 406 & 408). In an example, the first guest may load the CPU governor 192 during the boot of the first guest. In another example, the first guest may load the CPU governor 192 on demand and/or at any other suitable time. In an example, the CPU governor 192 may include an instruction that, when executed, prevents the guest from sending a request to halt a VCPU to the hypervisor for a predetermined amount of time. For example, the CPU governor 192 may prevent the first guest from sending a request to halt the VCPU to the hypervisor 160 when a new interrupt is expected to arrive within a predetermined amount of time.

After loading the CPU governor 192, the first guest may send a request to disable halt-polling to a hypervisor 160 (block 410). In an example, the first guest may send the request to disable the halt polling to the hypervisor 160 by sending a hypercall to the hypervisor 160. In an example, the CPU governor 192 may send the request (e.g., hypercall) to disable halt-polling to the hypervisor 160. The hypervisor 160 may detect the request to disable the halt polling (block 412). Then, the hypervisor 160 may set a halt polling disable flag 220A in hypervisor memory 165 (block 414). The halt polling disable flag 220A may be associated with a VCPU 175A of the virtual machine 170A. Then, the halt polling disable flag 220A may be set to a value (e.g., "1") indicating that the halt-polling is disabled on the VCPU 175A (block 416).

At a later time, the VCPU 175A may become idle and have no task to process (block 418). Then, the CPU governor 192 may determine whether a new interrupt is expected to arrive for the VCPU 175A within a predetermined amount of time. If the CPU governor 192 determines that no new interrupt is expected to arrive within the predetermined amount of time (block 420), the first guest may send a request to halt the VCPU 175A (block 422). In an example, if the CPU governor 192 determines that a new interrupt is expected to arrive for the VCPU 175A within the predetermined amount of time, the CPU governor 192 may prevent the first guest from sending the request to halt the VCPU to the hypervisor 160 (e.g., for the predetermined amount of time).

In response to detecting the request to halt the VCPU 175A (block 424), the hypervisor 160 may read the halt polling disable flag 220A, which is associated with the VCPU 175A (blocks 426 & 428). Then, the hypervisor 160 may detect that the halt polling disable flag 220A for the VCPU 175A is set (i.e., halt-polling disabled) (block 430).

Then, the hypervisor 160 may halt the VCPU 175A (block 432). Then, the VCPU 175A may be halted (block 434). In an example, when the VCPU 175A is halted, the physical processor on which the VCPU 175A was running may execute another task (e.g., another VCPU 175B) or be in an idle-state. In an example, the halt polling disable flag 220A may be cleared when the virtual machine 170A is reset or restarts. For example, when the halt polling disable flag 220A is cleared, the value in the flag may be updated (e.g., to "0") to indicate that the halt-polling is enabled on the VCPU 175A.

In an example, the first guest may unload the CPU governor 192 at a later time after the CPU governor 192 was loaded. In this case, the first guest may send a request to the hypervisor 160 to enable halt-polling. Upon detecting the request, the hypervisor 160 may clear the halt-polling disable flag 220A to enable the halt-polling.

In an example, the hypervisor 160 may boot a second guest of a second virtual machine 170B (blocks 436 & 438). This time, the second guest may not load a CPU governor and, thus, the hypervisor 160 may not set a halt polling disable flag 220B associated with a second VCPU 175B of the second virtual machine 170B. In an example, the default value of the halt polling disable flags (e.g., 220A-B) may be a value (e.g., "0") indicating that the halt-polling is enabled. After the second guest is booted, the second guest may send a request to halt the second VCPU 175B (block 440). In an example, the second guest may send the request to halt the second VCPU 175B when the second VCPU 175B becomes idle and/or has no task to process.

When the hypervisor 160 detects the request to halt the second VCPU 175B (block 442), the hypervisor 160 may read the second halt polling disable flag 220B in the hypervisor memory 165 (blocks 445 & 446). Then, the hypervisor 160 may detect that the second halt polling disable flag 220B is not set (i.e., halt-polling enabled) (block 448). Then, the hypervisor 160 may read an instruction for halt-polling (block 450). In an example, this instruction for halt-polling may be stored in the hypervisor memory 165. In another example, this instruction for halt-polling may be stored in any suitable memory location accessible by the hypervisor 160.

Then, the hypervisor 160 may determine whether a new interrupt is expected to arrive within a predetermined amount of time (block 452). In an example, the hypervisor may determine the predetermined amount of time based on a predetermined heuristic. If the hypervisor 160 determines that the new interrupt is expected to arrive for the second VCPU 175B within the predetermined amount of time, the hypervisor 160 may determine to poll the second VCPU 175B (blocks 454 & 456). In this case, the hypervisor 160 may wait for the new interrupt instead of executing another task (e.g., another VCPU) on the physical processor on which the second VCPU 175B was running. In an example, the hypervisor 160 may wait for the new interrupt for the predetermined amount of time, and halt the second VCPU 175B if no new interrupt arrives within the predetermined amount of time.

If a new interrupt arrives before the predetermined amount of time has passed, the hypervisor 160 may enter the virtual machine 170B in a guest mode, rerun the VCPU 175B, and process the interrupt. In this case, the hypervisor 160 may determine not to halt the VCPU 175B until there is a new halt request for the second VCPU 175B. In another example, the hypervisor may poll the second VCPU 175B until there is another halt request for the second VCPU 175B even if no new interrupt arrives before the predetermined amount of time has passed. In an example, if the hypervisor 160 determines that no new interrupt is expected to arrive within the predetermined amount of time, the hypervisor 160 may halt the second VCPU 175B (blocks 458 & 460).

Figure 5:
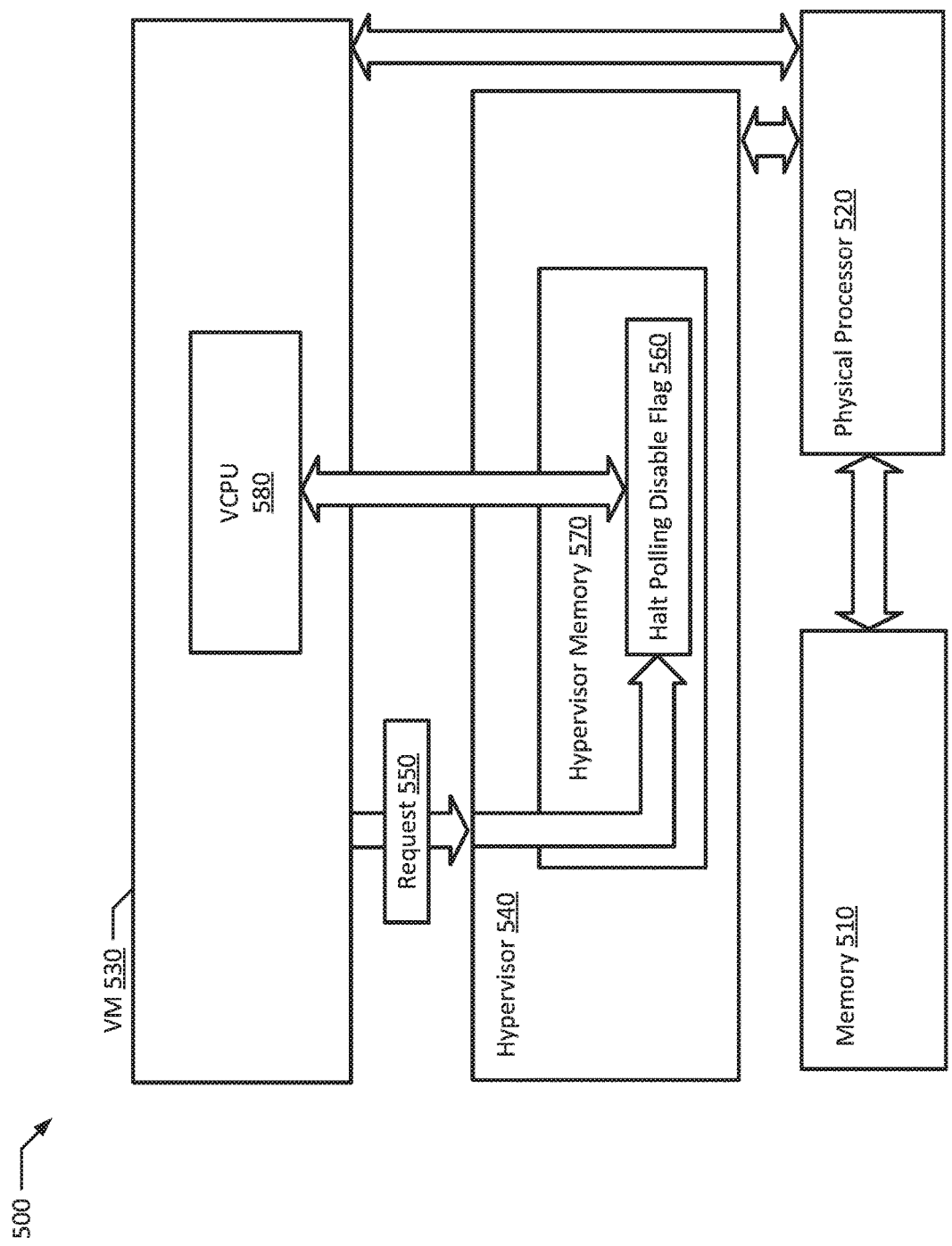
FIG. 5 is a block diagram of an example computer system according to an example of the present disclosure.

FIG. 5 shows a block diagram of an example system according to an example of the present disclosure. As illustrated in FIG. 5, an example system 500 includes a memory 510, one or more physical processors 520 in communication with the memory 510, a virtual machine 530 executing on the one or more physical processors 520, and a hypervisor 540 executing on the one or more physical processors 520. In an example, the hypervisor 540 detects a request 550 to disable halt polling. Then, the hypervisor 540 sets a halt polling disable flag 560 in hypervisor memory 570. The halt polling disable flag 560 may be associated with a virtual central processing unit (VCPU) 580 of the virtual machine 530. Accordingly, the presently disclosed system may allow a guest to control the halt-polling and to disable the halt-polling when necessary (e.g., when a CPU governor is loaded in the guest), which may advantageously reduce CPU utilization and allow addressing requirements for over-committed CPU configurations. Also, since the guest of the present disclosure may be capable of setting the halt polling disable flag dynamically, the host does not need to be reconfigured depending on guests executed, which may make system management easier.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which, when executing the series of computer instructions, performs or facilitates the performance of all or part of the disclosed methods and procedures.

The examples may be embodied in the form of computer-implemented processes and apparatuses for practicing those processes. An example may also be embodied in the form of a computer program code containing instructions embodied in tangible media, such as floppy diskettes, CD-ROMs, DVD-ROMs, hard drives, or any other computer-readable non-transitory storage medium, wherein, when the computer program code is loaded into and executed by a computer, the computer becomes an apparatus for carrying out the method. An example may also be embodied in the form of computer program code, for example, whether stored in a storage medium, loaded into and/or executed by a computer, or transmitted over some transmission medium, such as over electrical wiring or cabling, through fiber optics, or via electromagnetic radiation, where when the computer program code is loaded into and executed by a computer, the computer becomes an apparatus for carrying out the method. When implemented on a general-purpose microprocessor, the computer program code segments configure the microprocessor to create specific logic circuits.

It should be understood that various changes and modifications to the examples described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method performed in a computer system comprising:
one or more virtual machines (VMs), wherein each VM having a guest and a virtual central processing unit (VCPU), and a hypervisor executing on one or more physical processors, wherein the hypervisor having a data structure that includes a plurality of halt polling disable flags, each halt polling disable flag configured to indicate whether a halt polling of a given VCPU of a respective VM is disabled or not, wherein the method comprising:
booting a guest of a first VM of the one or more VMs by the hypervisor;
in response to booting, the guest of the first VM performs:
loading a CPU governor in the first VM; and
sending a request to the hypervisor to disable the halt polling of a VCPU of the first VM;
detecting, by the hypervisor, the request to disable the halt polling of the VCPU of the first VM, wherein the halt polling is a function that causes the hypervisor, when detecting a request to halt the VCPU, to wait for a new interrupt for a first predetermined amount of time and to poll for the new interrupt while refraining from running another VCPU during the first predetermined amount of time;
setting by the hypervisor a halt polling disable flag associated with the first VM in response to detecting the request to disable the halt polling of the VCPU of the first VM, wherein the setting of the halt polling disable flag disables the halt polling of the VCPU of the first VM;
at a later time when the VCPU of the first VM becomes idle, determining, by the CPU governor, whether a new interrupt is expected to arrive within a second predetermined amount of time;
in response to determining that no new interrupt is expected to arrive within the second predetermined amount of time, sending, by the guest, the request to halt the VCPU of the first VM to the hypervisor; and
when detecting by the hypervisor that the halt polling disable flag is set, halting, the VCPU of the first VM.

2. The method of claim 1, wherein the CPU governor includes an instruction which, when executed, prevents the guest from sending the request to halt the VCPU to the hypervisor when the new interrupt is expected to arrive within the second predetermined amount of time.

3. The method of claim 1, further comprising:
detecting, by the hypervisor, the request to halt the VCPU of the first VM;
reading, by the hypervisor, the halt polling disable flag;
detecting, by the hypervisor, that the halt polling disable flag is set; and
responsive to detecting that the halt polling disable flag is set, halting, by the hypervisor, the VCPU of the first VM.

4. The method of claim 3, further comprising:
unloading, by the guest, the CPU governor in the first VM; and
responsive to unloading the CPU governor, sending, by the guest, a request to enable the halt polling to the hypervisor.

5. The method of claim 3, further comprising:
detecting, by the hypervisor, a request to halt a second VCPU of a second VM;
reading, by the hypervisor, a second halt polling disable flag in hypervisor memory, wherein the second halt polling disable flag is associated with the second VCPU of the second VM;
detecting, by the hypervisor, that the second halt polling disable flag is not set; and reading an instruction for the halt polling.

6. The method of claim 5, further comprising determining, by the hypervisor, whether the new interrupt is expected to arrive within the first predetermined amount of time.

7. The method of claim 6, further comprising, responsive to determining that the new interrupt is expected to arrive within the first predetermined amount of time, polling, by the hypervisor, the VCPU, waiting for the new interrupt to arrive.

8. The method of claim 1, wherein the guest loads the CPU governor during a boot of the guest.

9. The method of claim 1, wherein the halt polling disable flag is cleared responsive to a reset or a restart of the respective VM such that the halt polling is enabled.

10. The method of claim 1, wherein the request to disable the halt polling is a hypercall.

11. A system comprising:
a memory;
one or more physical processors in communication with the memory;
one or more virtual machines (VMs) executing on the one or more physical processors, each VM having a guest and a virtual central processing unit (VCPU); and
a hypervisor executing on the one or more physical processors, wherein the hypervisor having a data structure that includes a plurality of halt polling disable flags, each halt polling disable flag configured to indicate whether a halt polling of a given VCPU of a respective VM is disabled or not,
wherein the hypervisor:
boots a guest of a first VM of the one or more VM;
wherein in response to booting, the guest of the first VM:
loads a CPU governor in the first VM; and
sends a request to the hypervisor to disable the halt polling of a VCPU of the first VM;
wherein the hypervisor further:
detects the request to disable the halt polling of the VCPU of the first VM, wherein the halt polling is a function that causes the hypervisor, when detecting a request to halt the VCPU, to wait for a new interrupt for a first predetermined amount of time and to poll for the new interrupt while refraining from running another VCPU during the first predetermined amount of time; and
sets a halt polling disable flag associated with the first VM in response to detecting the request to disable the halt polling of the VCPU of the first VM, wherein the setting of the halt polling disable flag disables the halt polling of the VCPU of the first VM,
wherein at a later time when the VCPU of the first VM becomes idle, the CPU governor determines whether a new interrupt is expected to arrive within a second predetermined amount of time,
wherein in response to determining that no new interrupt is expected to arrive within the second predetermined amount of time, the guest sends the request to halt the VCPU of the first VM to the hypervisor, and
wherein when detecting that the halt polling disable flag is set, the hypervisor halts the VCPU of the first VM.

12. The system of claim 11, wherein the hypervisor:
detects the request to halt the VCPU of the first VM;

reads the halt polling disable flag;
detects that the halt polling disable flag is set; and
responsive to detecting that the halt polling disable flag is set, halts the VCPU of the first VM.

13. The system of claim 12, wherein the guest:
unloads the CPU governor in the first VM; and
responsive to unloading the CPU governor, sends a request to enable the halt polling to the hypervisor.

14. The system of claim 12, wherein the hypervisor:
detects a request to halt a second VCPU of a second VM;
reads a second halt polling disable flag in hypervisor memory, wherein the second halt polling disable flag is associated with the second VCPU of the second VM;
detects that the second halt polling disable flag is not set; and
reads an instruction for the halt polling.

15. The system of claim 11, wherein the CPU governor is a paravirtualized idle CPU governor.

16. The system of claim 11, wherein the halt polling disable flag is cleared responsive to a reset or a restart of the respective VM such that the halt polling is enabled.

17. A non-transitory machine readable medium in a computer system comprising: one or more virtual machines (VMs), wherein each VM having a guest and a virtual central processing unit (VCPU), and a hypervisor executing on one or more physical processors, wherein the hypervisor having a data structure that includes a plurality of halt polling disable flags, each halt polling disable flag configured to indicate whether a halt polling of a given VCPU of a respective VM is disabled or not, the non-transitory machine readable medium storing instructions, which when executed by one or more physical processors, cause the one or more physical processors to:

boot a guest of a first VM of the one or more VMs by the hypervisor;

in response to booting, load, by the guest of the first VM, a CPU governor in the first VM, and send a request to the hypervisor to disable the halt polling of a VCPU of the first VM;

detect, by the hypervisor, the request to disable the halt polling of the VCPU of the first VM, wherein the halt polling is a function that causes the hypervisor, when detecting a request to halt the VCPU, to wait for a new interrupt for a first predetermined amount of time and to poll for the new interrupt while refraining from running another VCPU during the first predetermined amount of time;

set, by the hypervisor, a halt polling disable flag associated with the first VM in response to detecting the request to disable the halt polling of the VCPU of the first VM, wherein the setting of the halt polling disable flag disables the halt polling of the VCPU of the first VM:

at a later time when the VCPU of the first VM becomes idle, determine, by the CPU governor, whether a new interrupt is expected to arrive within a second predetermined amount of time;

in response to determining that no new interrupt is expected to arrive within the second predetermined amount of time, send, by the guest, the request to halt the VCPU of the first VM to the hypervisor; and when detecting by the hypervisor that the halt polling disable flag is set, halt, the VCPU of the first VM.

* * * * *